Dec. 29, 1959 D. L. JONES 2,918,962
MACHINE FOR PRODUCING FINNED TUBING
Filed Nov. 16, 1953 6 Sheets-Sheet 1

INVENTOR.
Dougan L. Jones
BY
ATTORNEY.

Dec. 29, 1959 D. L. JONES 2,918,962
MACHINE FOR PRODUCING FINNED TUBING
Filed Nov. 16, 1953 6 Sheets-Sheet 2
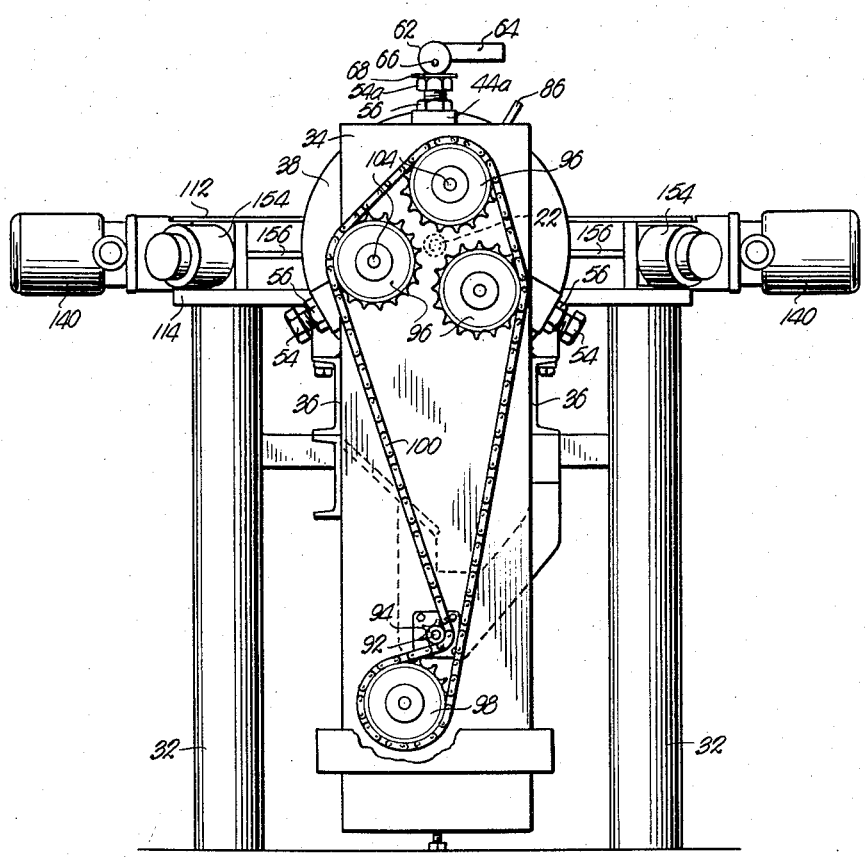
Fig. 3.
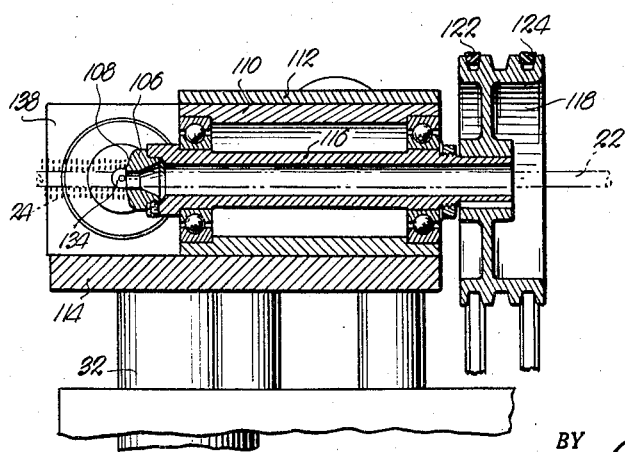
Fig. 10.
INVENTOR.
Dougan L. Jones
BY 
ATTORNEY.

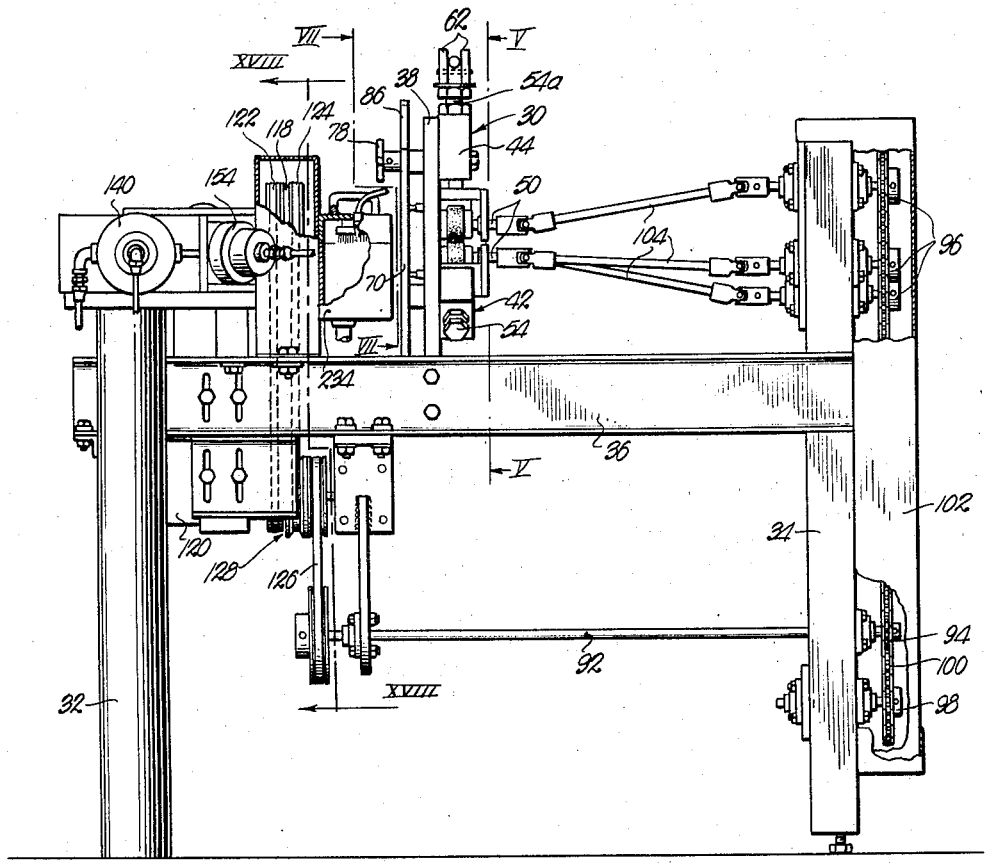
Fig. 4.
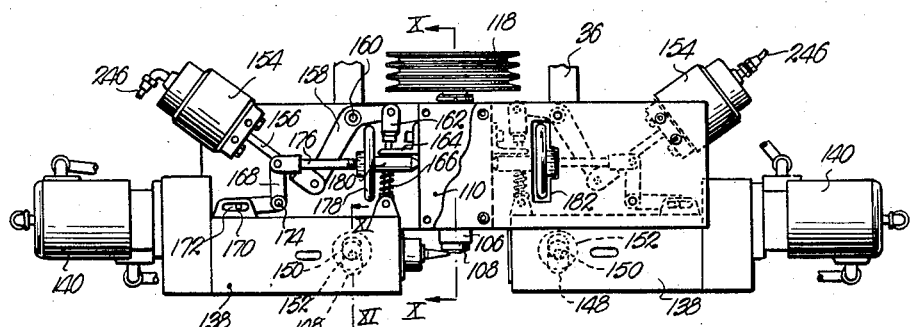
Fig. 9.
INVENTOR.
Dougan L. Jones
ATTORNEY.

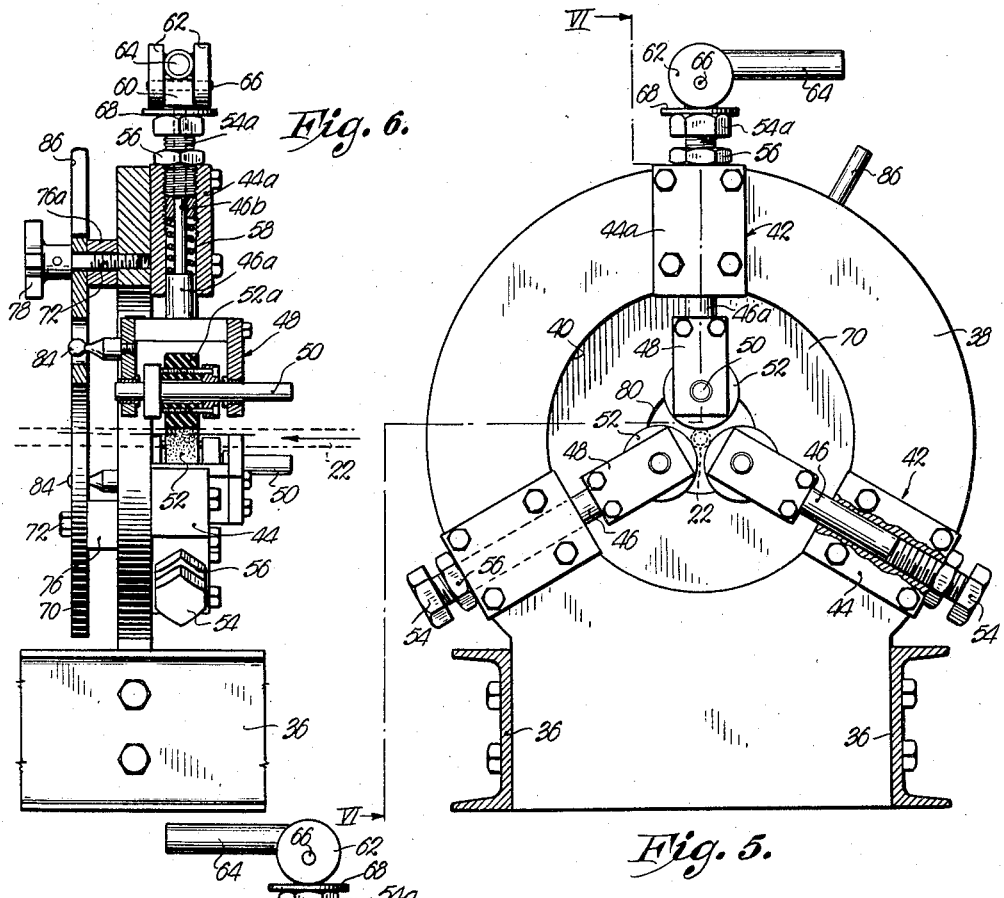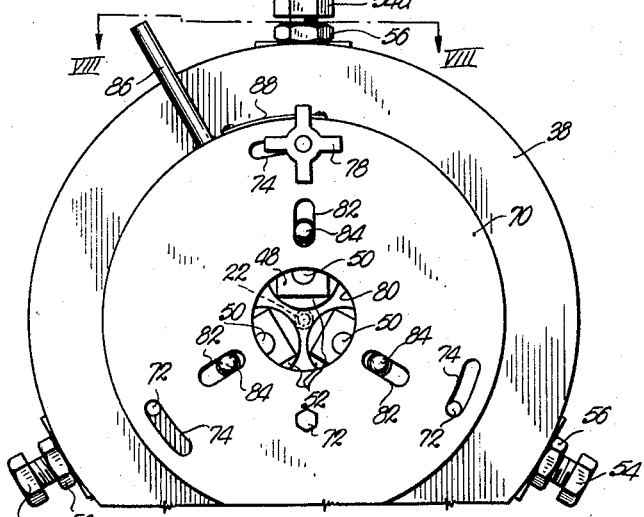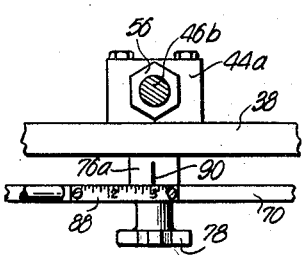

Dec. 29, 1959   D. L. JONES   2,918,962
MACHINE FOR PRODUCING FINNED TUBING
Filed Nov. 16, 1953   6 Sheets-Sheet 5
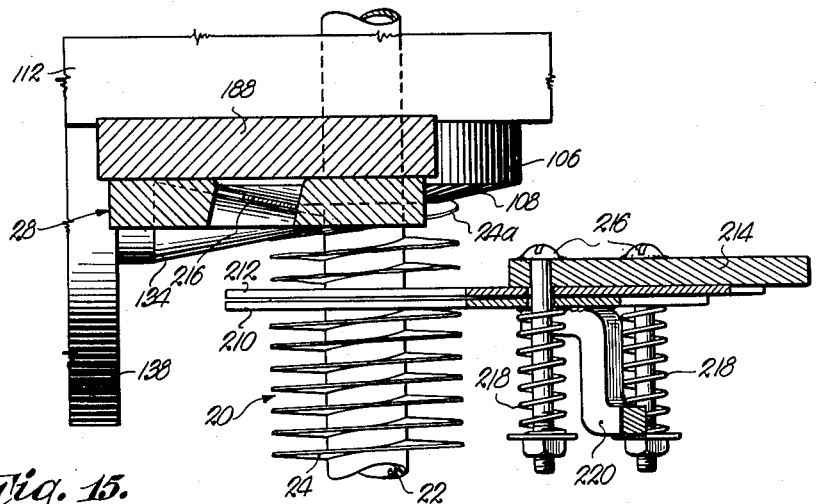
Fig. 15.
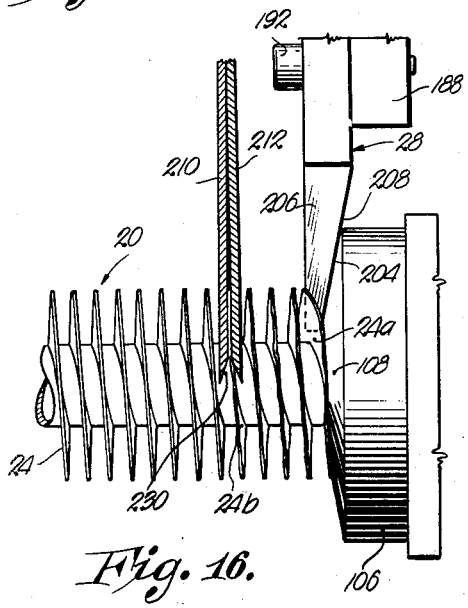
Fig. 16.
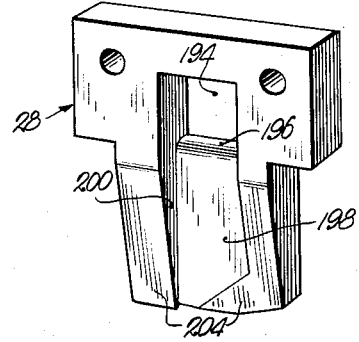
Fig. 17.
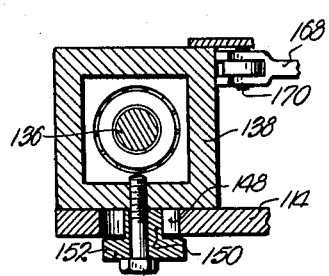
Fig. 11.
INVENTOR.
Dougan L. Jones
BY
ATTORNEY.

Dec. 29, 1959  D. L. JONES  2,918,962
MACHINE FOR PRODUCING FINNED TUBING
Filed Nov. 16, 1953  6 Sheets-Sheet 6
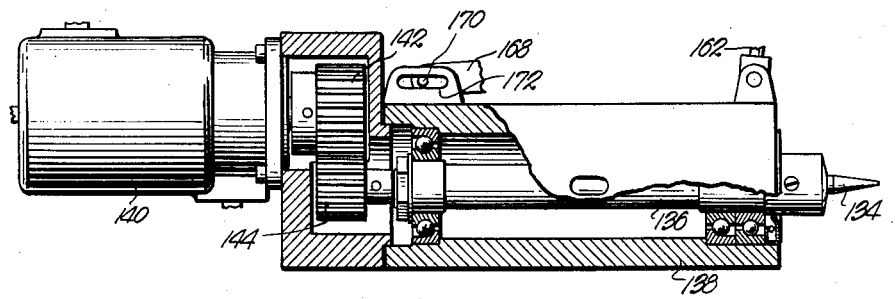
Fig. 12.
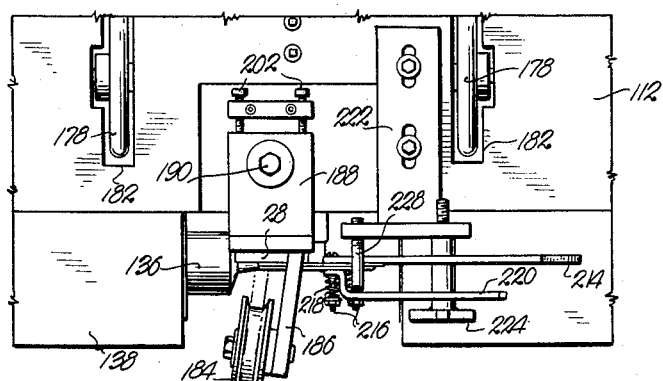
Fig. 13.
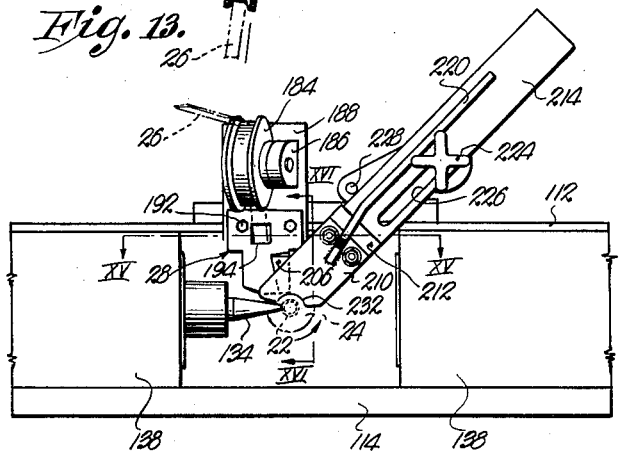
Fig. 14.
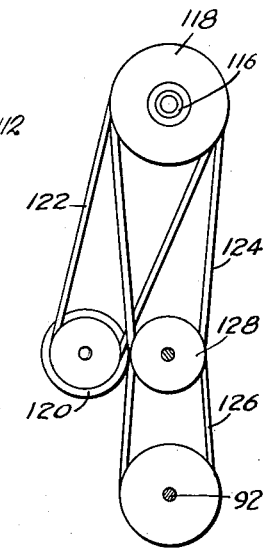
Fig. 18.
INVENTOR.
Dougan L. Jones
BY
ATTORNEY.

United States Patent Office 2,918,962
Patented Dec. 29, 1959

2,918,962

MACHINE FOR PRODUCING FINNED TUBING

Dougan L. Jones, Lee's Summit, Mo., assignor to The Marley Company, Kansas City, Mo., a corporation of Delaware Application November 16, 1953, Serial No. 392,100

8 Claims. (Cl. 153—64.5)

This invention relates to heat exchange structure utilizing finned tubing wherein the fin is in the form of a spiral wound upon the tube throughout the length thereof, the primary object being to provide an improved machine for forming the tape-like fin material in a spiral or helix and automatically applying the same to the tube as the latter is advanced and rotated along its longitudinal axis.

It is the most important object of the present invention to provide a finning machine having improved apparatus for advancing and rotating the tube; novel structure for feeding, guiding and winding the tape upon the tube as it advances and rotates; efficient and easily operated mechanism for adjusting the relative position of the spiral forming rolls; and an improved arrangement of parts for adjusting and synchronizing the relationship between the drive for the tube and the means for operating the forming rolls.

Another important object of the present invention is the provision of tube motivating apparatus that includes a number of roller assemblies so arranged as to simultaneously rotate and advance the tube and having novel equipment for permitting adjustment of the rollers, not only with respect to centering the tube for advancement along a predetermined path, but with respect to pressure of the rollers upon the tube and the angularity thereof with respect to the tube so that the speed of advancement of the tube may be selected as desired.

Another object, relating itself specifically to the apparatus just above mentioned, is to provide a single rotatable adjusting member common to all of the roller assemblies and manually rotatable to automatically change the angularity of the drive rollers of the assemblies with respect to the tube so that the latter will be advanced at a predetermined rate.

A further object is to provide in the tube motivating means quickly releasable parts for facilitating initial threading of the tube between frictional rollers adapted to drive the tube and including as a part thereof, resilient means to impart a yieldable bias of the rollers against the tube at all times.

Another important object of this invention is to provide a pressure roll unit that is fully adjustable not only with respect to the degree of pressure exerted upon the tape, but with respect to the position of the pressure roll relative to its associated forming roll, including not only the angularity of the pressure roll to the forming roll, but its position with respect to the tube and the tape being fed through the machine.

A further object of the present invention is the provision of tape guiding structure that includes a beveled surface for feeding the tape in proper relationship to the pitch line between the rolls, a linear surface for guiding the tape to the rolls so that one edge thereof properly engages the tube as the spiral is formed, and means including another beveled surface for separating the tape as it is fed from the first or proximal convolution thereof to the tube.

It is another very important object of the present invention to provide a spiraling machine including many of the aforesaid features capable of forming or elongating the tape in a manner to provide wrinkles therein as desired, together with means to iron out the wrinkles or shift the same from one edge of the tape in the spiral to the opposite edge thereof, all as desired by the operator and as determined by adjustment.

Still another object of this invention is the provision of a finning machine wherein the speed of advancement of the tube may be varied simultaneously and proportionately as the speed of rotation of the rolls is varied, and wherein the speed differential between the forming roll and the tube may be quickly and easily adjusted by the operator, all by the provision of structure for operating the tube motivating means from the said forming roll.

A still further object is to provide a machine for producing finned tubing having hydraulic means for automatically coordinating variable roll speeds.

In the drawings:

Fig. 3 is an elevational view showing that end of the machine opposite to Fig. 2.

Fig. 4 is a side elevational view thereof.

Fig. 5 is an enlarged, vertical, cross-sectional view taken on line V—V of Fig. 4, showing the apparatus for advancing and rotating the tube to which a spiral fin is to be applied.

Fig. 6 is a cross-sectional view taken on irregular line VI—VI of Fig. 5.

Fig. 7 is a fragmentary, elevational view taken on line VII—VII of Fig. 4 and showing that side of the tube motivating apparatus opposite to Fig. 5.

Fig. 8 is a fragmentary, detailed, cross-sectional view taken on line VIII—VIII of Fig. 7.

Fig. 9 is a fragmentary, top plan view illustrating the forming rolls, parts being broken away to reveal the mechanism for shifting and adjusting one of the rolls with respect to the other roll, the tape guide and the wrinkle ironing means being entirely removed.

Fig. 10 is an enlarged, fragmentary, detailed cross-sectional view taken on line X—X of Fig. 9.

Fig. 11 is an enlarged, fragmentary, detailed, cross-sectional view taken on line XI—XI of Fig. 9.

Fig. 12 is an enlarged, elevational view of the pressure roll, parts being broken away and in section to reveal details of construction of the mounting structure therefor.

Fig. 13 is a fragmentary, top plan view similar to Fig. 9 but showing the tape guiding structure and wrinkle ironing means in proper relationship to the rolls.

Fig. 14 is a fragmentary, front elevational view showing the structure illustrated by Fig. 13.

Fig. 15 is an enlarged, fragmentary, cross-sectional view through the tape guide and the wrinkle ironing means taken on line XV—XV of Fig. 14 and showing the finned tube as it is formed through use of the machine of this invention.

Fig. 16 is an enlarged, cross-sectional view taken on line XVI—XVI of Fig. 14 illustrating additionally the position of the parts of Figs. 13 to 15 inclusive with respect to the finned tube.

Fig. 17 is a rear perspective view of the tape guide; and

Fig. 18 is a schematic cross-sectional view taken substantially on the line XVIII—XVIII of Fig. 4 showing the belt-pulley drive arrangement.

Figure 1:
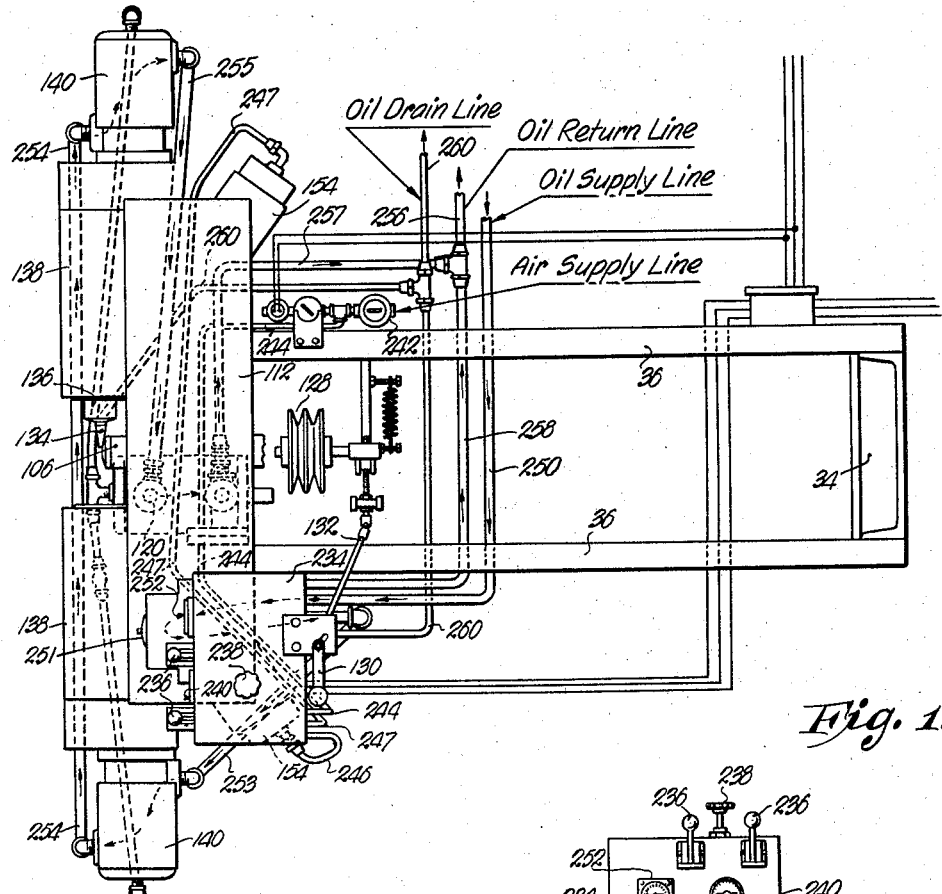
Figure 1 is a schematic, partial plan view of a machine for producing finned tubing made pursuant to the present invention and showing primarily the oil and air lines utilized in operating the various prime movers and other mechanism.

As above indicated, the machine about to be described has been designed for producing finned tubing broadly designated by the numeral 20 and illustrated only in Figs. 15 and 16 of the drawings, and it manifestly includes an elongated tube or core 22, having a spiral fin 24 wound tightly thereon. The tube 22 is also shown by dotted lines in Figs. 3, 5 to 7 inclusive, 10 and 14. The tape, which is initially flat and fed to the machine for forming the helical fin 24, is designated by the numeral 26 and illustrated by dotted lines in Figs. 13 and 14.

Tape 26 as it passes through guide 28, best shown in Fig. 17, is also illustrated in section in Fig. 15.

Tube feeding apparatus

In the machine chosen for illustration, the elongated tube 22 is fed or advanced along a rectilinear, horizontal path of travel and simultaneously rotated on its longitudinal axis by motivating apparatus which will first be described and which is broadly designated by the numeral 30 (Fig. 4). It may be first pointed out that the machine is provided with a suitable supporting frame that includes a pair of spaced legs 32 and a rearmost frame member 34 (Fig. 1) interconnected with the legs 32 through spaced-apart, horizontal beams 36.

Apparatus 30 includes a primary supporting disc 38, as shown in Figs. 4 to 8 inclusive, fastened to the beams 36 therebetween and having a central clearance opening 40. The disc 38 supports a plurality of roller assemblies 42, each of which includes a bearing 44 rigidly fastened to the disc 38 and each bearing 44 in turn receives an elongated spindle 46.

The three spindles 46 have their longitudinal axes radiating from the tube 22 as is best seen in Fig. 5 and are not only rotatable within the bearings 44, but reciprocable therein on their longitudinal axes toward and away from the tube 22. Each spindle 46 is provided with a U-shaped roller support 48 on the innermost end thereof carrying a rotatable shaft 50 upon which is mounted a frictional roller 52 for rotation therewith. The three rollers 52 may be made from rubber or other suitable material, and, during the operation of the machine, rollers 52 are held in frictional engagement with the tube 22 as shown in Figs. 5 to 7 inclusive.

Means is provided to advance and rotate the tube 22 on the axis of the opening 40 or along a path of travel suitable for proper winding of the fin 24 thereon, and such adjustment includes means for limiting the extent of outward movement of the spindles 46 radially away from the tube 22. As shown best in Fig. 5, two of the assemblies 42 are provided with studs 54 threaded into the bearings 44 in abutting relationship to the outermost ends of the corresponding spindles 46. It is clear that inward and outward movement of the studs 54 determine the position of the spindles 46 and, therefore, the rollers 52 corresponding thereto and the studs 54 are held against misadjustment by lock nuts 56.

The third or uppermost assembly 42 has its spindle designated by the numeral 46a, and is yieldably held with its roller 52a biased against the tube 22 by a spring 58 coiled thereabout within its bearing 44a. A tubular stud 54a in the bearing 44a, is held in adjusted positions by a lock nut 56a and reciprocably receives an extended length 46b of spindle 46a having a small block 60 secured to its uppermost end.

A pair of spaced discs 62 interconnected by a short handle 64 and embracing the block 60, are joined with the latter by a pivot pin 66 in eccentric relationship to the discs 62. A small plate 68 loosely surrounding the spindle portion 46b, is interposed between the stud 54a and the discs 62.

It is seen that the spring 58 yieldably holds the roller 52a biased against the tube 22 and that the tension of the spring 58 may be varied by adjustment of stud 54a.

As the roller 52a tends to move toward the bearing 44a, discs 62 are free to rise away from the plate 68. The grip of the rollers 52 on the tube 22 may be released by swinging the handle 64 upwardly from the position shown in Fig. 5, thereby increasing the space between the roller 52a and the two underlying rollers 52—52. By virtue of the provision of such quick release, threading of the tube 22 to the position shown in Figs. 5 to 7 inclusive, is facilitated.

It is manifest that if all of the horizontal shafts 50 were maintained in parallelism with the longitudinal axis of the tube 22, the three rollers 52 would rotate the tube 22 but fail to advance the same in the direction of the arrow of Fig. 6. Accordingly, means common to all of the assemblies 42 is provided to vary the angle of the rollers 52 relative to the tube 22. During such adjustment the shafts 50 remain horizontal but are out of parallelism with the horizontal tube 22.

A rotatable secondary disc 70 is mounted upon the disc 38 through the provision of a plurality of fixtures 72 extending through elongated, arcuate slots 74 in the disc 70 concentric with the axis of rotation of the disc 70. Spacers 76 on the fixtures 72, hold the discs 38 and 70 apart, and a manual handle 78 on one of the fixtures 72 permits clamping of the disc 70 against the proximal spacer 76a to hold the disc 70 against rotation.

Disc 70 is provided with a clearance opening 80 centrally thereof for the tube 22, and has a number of openings 82 therein for receiving followers 84. There is a follower 84 for each assembly 42 respectively, mounted directly on the roller supports 48 and it is seen that the openings 82 are elongated and radial with respect to the axis of rotation of disc 70 to permit shifting of the rollers 52 toward and away from the axis of tube 22 upon adjustment of the studs 54 and 54a.

A handle 86 on the disc 70 facilitates rotation of the latter upon loosening of the fixture 72 having handle 78 thereon. A calibrated plate 88 on the peripheral edge of disc 70 adjacent the handle 86, and associated with an indicating line 90 on the spacer 76a, indicates the position of the disc 70 relative to the disc 38. It is seen that rotation of the disc 70 rotates the roller supports 48 and, therefore, the rollers 52 on the axes of the spindles 46, through the followers 84 and slots 82, to select the angularity of the longitudinal axes of the shafts 50 with respect to the tube 22.

With the shafts 50 driven at a predetermined speed, the angularity of the rollers 52 with respect to the tube 22 and the extent of pressure of rollers 52 on the tube 22 as determined by the spring 58, will in turn determine the speed of advancement of tube 22 in the direction of the arrow of Fig. 6.

Roller drive means

The drive means for the shafts 50 and, therefore, the rollers 52, includes a primary shaft 92 underlying the beams 36 in substantial parallelism with the tube 22 as shown best in Fig. 4 and having a sprocket wheel 94 on one end thereof as seen in Fig. 3.

A sprocket wheel 96 for each shaft 50 respectively, and an idler sprocket wheel 98 are all rotatably carried by the frame 34 and interconnected by a suitable continuous chain 100 that is also in mesh with the sprocket wheel 94. The chain cover is entirely removed in Fig. 3 of the drawings for clearness and it is obvious that such cover 102 (Fig. 4), as well as the frame 34, are provided with clearance openings for the tube 22 that is fed to the apparatus 30 from a suitable support (not shown) extending outwardly and rearwardly from the frame 34. The three sprocket wheels 96 are joined with their corresponding shafts 50 by means of driven shafts 104, having the necessary universal joints therein as seen in Fig. 4. The means for driving the shaft 92 will hereinafter be made clear.

Mandrel roll unit

As above indicated, the tape 26 is formed into the fin 24 through use of coacting rolls. One of such rolls is best seen in Figs. 9, 10, 15 and 16 of the drawings and is designated by the numeral 106. It is hollow to clear the tube 22 and provided with a frusto-conical operating surface 108.

A central head 110, secured to a pair of spaced, horizontal plates 112 and 114 therebetween, rotatably receives a tubular shaft 116 to which the roll 106 is releasably affixed at one end thereof, as shown in Fig. 10. The tubular shaft 116 through which the tube 22 extends, has a pulley 118 mounted on the opposite end thereof between the head 110 and the disc 70 of apparatus 30 as shown in Fig. 4.

Figure 2:
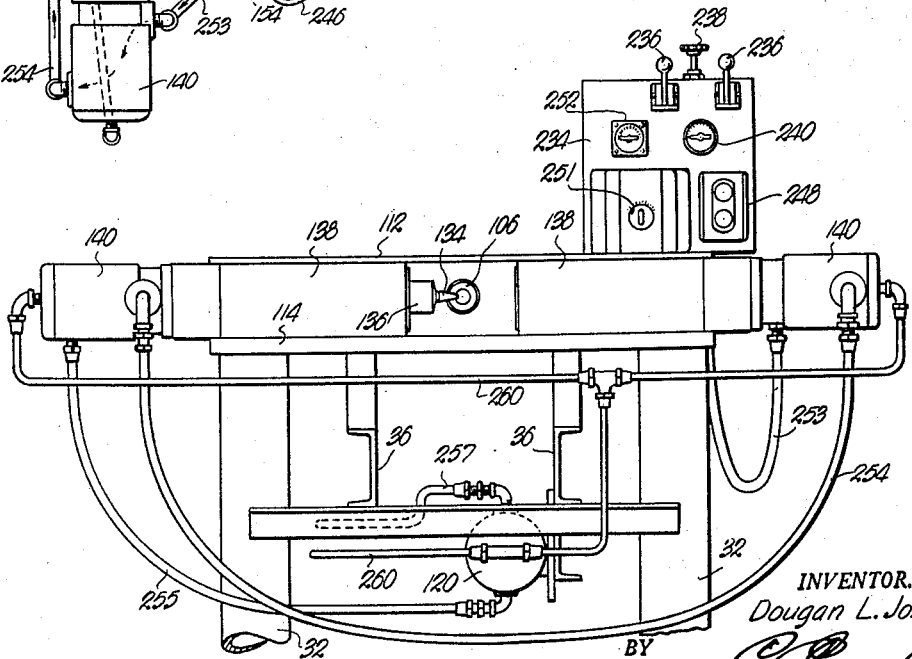
Fig. 2 is a front elevational view showing schematically the arrangement of certain of the parts of the machine and the aforementioned flow lines.

The shaft 116, and therefore the roll 106, are rotated by a variable speed prime mover 120 beneath the head 110 and secured to the beams 36 therebelow as shown in Figs. 1, 2 and 4 of the drawings. Prime mover 120 is coupled with pulley 118 by a belt 122 and the shaft 92 (Fig. 4) is in turn driven from the pulley 118 by belts 124 and 126 (see Fig. 18). Such coupling means between the pulley 118 and the shaft 92 includes a variable speed transmission in the form of a double-acting, variable pulley 128 operably supported by the beams 36 between the shaft 92 and the pulley 118 as shown in Figs. 1 and 4. The pulley assembly 128 that is readily available on the open market is manually adjustable with respect to both belts 124 and 126 and an operating handle 130 is shown in Fig. 1 of the drawings, connected with the pulley means 128 by shaft means 132.

Accordingly, the speed of rotation of the roll 106 may be varied by adjusting the speed of the prime mover 120, which in turn varies the speed of rotation of the rollers 52 and thereby effects the speed of advancement and the speed of rotation of the tube 22 separate and distinct from any adjustment that is made in the apparatus 30. By the same token, the speed of rotation of the roll 106 relative to the speed of advancement and rotation of the tube 22 may be varied by manipulation of handle 130 to adjust the position of variable speed pulley 128 relative to shaft 92. Manual movement of variable pulley 128 away from the axis of shaft 92 causes the two sections of the pulley having belt 126 trained thereover to be moved away from each other while at the same time, the sections presenting the pulley receiving belt 122 are shifted toward each other and thus changing the speed at which variable pulley 128 and thereby forming roll 106 are rotated relative to shaft 92. Shifting of pulley 128 toward the axis of shaft 92 produces an opposite effect with the pulley which receives belt 126 closing while the variable pulley having belt 122 thereover is opened a corresponding amount.

Pressure roll assembly

While the machine is adapted to utilize one or more pressure rolls in association with the forming roll 106 as indicated in Fig. 1, and partially by Fig. 9 of the drawings, it is necessary to explain the construction and operation of but one of such assemblies, reference being had to Figs. 1, 2, 9 and 12 of the drawings.

Pressure roll 134 is conical and releasably secured in one end of a shaft 136 that is in turn rotatably carried by a hollow head 138. The head 138 likewise supports a prime mover 140, having a gear 142 on its drive shaft meshing with a pinion 144 on the driven shaft 136.

Head 138 rests upon the lowermost plate 114 forwardly of the head 110 as shown in Fig. 10, and is movably secured thereto by means of a single bolt 146 as shown in dotted lines by Fig. 9 and as illustrated in Fig. 11. The bottom plate 114 is provided with an elongated slot 148 within which is disposed a cam element 150. Cam element 150 is integral with a disc 152 threaded on the bolt 146 and underlying the plate 114 to hold the head 138 against upward movement.

It is noted that the bolt 146 is eccentric to the cam element 150 and that the latter has a thickness greater than the thickness of the bottom plate 114. Thus, when the bolt 146 clamps the element 150 tightly against the lowermost face of the head 138, the latter is free to swing rearwardly and forwardly as the cam element 150 reciprocates in the slot 148. It is now apparent that adjustment of the cam 150 shifts the head 138 on the longitudinal axis of the shaft 136 to move the roll 134 toward and away from the tube 22.

Power means for shifting the roll 134 toward and away from the roll 106 and for holding the roll 134 tightly against the tape 26 (Fig. 15) includes a prime mover 154 suitably mounted between the plates 112 and 114 and provided with a reciprocable stem 156. A substantially L-shaped crank 158 between the plates 112 and 114, is secured to the latter by a pivot pin 160 and has one end thereof pivotally joined to the stem 156. The opposite end of the crank 158 pivotally receives a link 162 that is in turn pivotally joined to the head 138 near the roll 134. Link 162 passes through a bracket 164 on the head 110 and a spring 166, coiled about the link 162 between the bracket 164 and the head 138, yieldably biases the roll 134 away from the roll 106.

The head 138 is also pivotally mounted remote from the roll 134 on a second crank 168 by means of a pivot pin 170 on the latter that rides in a slot 172. The crank 168 between the plates 112 and 114 has pivotal connection with the latter as at 174 and extensible linkage is interposed between the head 110 and the crank 168. It includes a link 176 pivotally joined to the crank 168, an adjusting wheel 178 in screw-threaded engagement with the link 176, and a bearing pin 180 that engages the head 110 and is integral with the wheel 178. Clearance openings 182 are provided in the uppermost plate 112 for the wheels 178 and suitable calibrations on the wheel 178 and the link 176 as shown in Fig. 9 indicate the position of the wheels 178.

The slot 148 is sufficiently long to prevent engagement at the innermost end thereof by the cam element 150 when the roll 134 is brought against the tape 26 to clamp the latter tightly against the inclined surface 108 of roll 106. It is thus seen that upon energization of prime mover 154 to extend its stem 156, crank 158 is swung counter-clockwise, viewing Fig. 9, exerting a pull upon the link 162 and thereby swinging the head 138 inwardly to move the roll 134 tightly against the tape 26. Head 138 swings and slides slightly on pivot point 170 during operation of the prime mover 154 and the extent of clockwise rotation (viewing Fig. 9) of crank 168 when the roll 134 is pressed against the tape 26, is limited by the bearing pin 180 engaging the head 110. Thus, when prime mover 154 is exerting a pull on link 162 to clamp the tape 26 tightly between rolls 134 and 106, it tends to rotate crank 168 clockwise (viewing Fig. 9) thereby pressing pin 180 tightly into its seat within head 110. If under such conditions, wheel 178 was adjusted to vary the effective length of link 176, the longitudinal axis of the head 138 would vary since cam 50 is free to move in slot 148. In this way the angular relationship of role 134 to roll 106 may be varied. When the prime mover 154 is energized to retract its stem 156, head 138 swings on pin 170, cam element 150 slides outwardly in the slot 148 and the roll 134 moves away from the roll 106 to permit threading of the tape 26 between the effective surfaces of the rolls 106 and 134.

Tape feeding structure

It is contemplated that the tape 26 be initially wound on a supply drum, not shown, from which it is directed over a pulley as shown in Figs. 13 and 14 of the drawings. Pulley 184 is rotatably mounted on an arm 186 extending forwardly from a mounting block 188 that is secured to the plate 112 by bolt 190. The guide 28 of Fig. 17 is in turn secured to the outermost vertical face of the block 188 below the arm 186 by fasteners 192. From the pulley 184, tape 26 is threaded through an opening 194 in the guide 28, whence it passes over a rounded edge 196 constituting the lowermost end of the opening 94. Tape 26 extends downwardly from the edge 196, along an elongated, longitudinally vertical, transversely beveled surface 198 in the rearmost face of the guide 28.

The surface 198 is formed in the guide 28 by grooving the latter and its transverse inclination corresponds to the pitch line between the roll 134 and the inclined surface 108 of roll 106. It is seen in Fig. 15 that, while the axis of the roll 134 is substantially perpendicular to the longitudinal axis of the tube 22, its conical surface and the surface 108 of roll 106, are at a tangent to the tube 22, extending outwardly and forwardly as the tube 22 is approached.

The tape 26 passes from the surface 198 of guide 28 directly above the rolls 106 and 134, or more accurately, directly above the pass therebetween, and by virtue of the inclination of surface 198, the tape 26 is directed to the rolls 134 and 106 substantially at the angle shown in Fig. 15.

The guide 28 serves the additional function of properly guiding one edge of the tape 26 to the tube 22. To this end, the groove that is formed in the rearmost face of the guide 28 to present the surface 198, has a vertical linear surface 200 for receiving one edge of the tape 26 and holding such edge in a position where it will immediately engage the tube 22 as the tape 26 emanates from between the rolls 106 and 134 therebelow. This edge of the tape 26 constitutes, therefore, the innermost edge of the fin 24 which actually contacts the tube 22 in the finished product.

It is important that the surface 200 be properly positioned and, therefore, adjustment is provided through the medium of a pair of studs 202 mounted on the plate 112 and bearing against the block 188 to hold the latter against swinging movement on the bolt 190 (see Fig. 13).

The third function of the guide member 28 is to separate the tape 26 as it descends from the rolls 106 and 134 and commences to coil about the tube 22 from the first convolution 24a of the fin 24.

It is noted in Fig. 16 of the drawings that the rearmost face of the guide member 28 is provided with a beveled surface 204 that slopes vertically in conformity with the angularity of the surface 108 which it faces. The outermost face of the guide 28 on the other hand, is provided with a beveled surface 206 that is in opposed relationship to the roll 134 shown in Fig. 15, and which merges with the beveled surface 204 in a knife edge 208. The surface 206 is likewise in conformity with the bevel 108 of roll 106 in that it not only slopes toward the knife edge 208, but becomes progressively deeper in the guide member 28 as the uppermost end of the surface 206 is approached.

Thus, as the tape 26 is advanced by the rolls 106 and 134 around the rotating and forwardly moving tube 22 to form the fin 24 thereon, the first convolution 24a will be deflected forwardly as shown in Fig. 16, and the guide 28 therefore, serves to move the convolution 24a away from the surface 108 where it will not tangle with the tape 26 as the latter emanates from between the rolls 134 and 106. Note also, that the guide 28 serves to guide the convolution 24a to one side of the roll 134 opposite to the tape 26 as shown in Fig. 15.

Wrinkle ironing means

By proper adjustment of the various parts hereinabove described, and particularly the roll 134 with respect to the roll 106 and with respect to the tube 22, the tape 26 may be formed or elongated in virtually any desired manner as the spiral fin 24 is produced.

By way of example, the fin 24 may be provided with wrinkles transversely thereof along the outermost edge of the fin 24 as it emanates from the rolls simply by varying the angularity of the roll 134 through manipulation of wheel 178. If increased pressure is applied to the tape 26 over and above that which would normally be necessary to form the spiral fin 24, the aforesaid wrinkles will be produced along the outermost edge.

These wrinkles may be removed entirely by using the powered rotations of the tube to elongate the innermost edge of the fin 24 adjacent the tube. Sufficient torque is applied to remove the wrinkles but not stretch the metal at the outermost edge of the fin, with the resultant springback tending to secure the fin tightly on the tube. Wrinkles may also be formed at the innermost edge of the fin 24 by roll forming a lesser percentage of the width of the fin and bending instead of rolling the innermost edge forming wrinkles adjacent the tube.

A pair of ironing plates 210 and 212 are mounted on an elongated bar 214 through the medium of a pair of bolts 216 as shown in Fig. 15. They were held pressed tightly against the bar 214 by springs 218 coiled on the bolts 216. A handle 220 secured to the plate 210 may be pressed toward the bar 214 to separate the plates 210 and 212 as the plate 210 tips on its uppermost edge bearing against the plate 212 and acting as a fulcrum.

The bar 214 (Fig. 13) is mounted on an L-shaped bracket 222 adjustably secured to the plate 112 through the medium of a fastener 224 extending through a slot 226 in the bar 214. A stud 228 on the bracket 222 prevents the convolution 24b from swinging the plates 210 and 212 upwardly away from the tube 22 on the axis of fastener 224. However, upon loosening of the fastener 224, the bar 214 may be shifted so as to move the plates 210 and 212 to and from an operative position with respect to the convolution 24b. The plates 210 and 212 are beveled on their proximal faces at the heel thereof to present a V-shaped notch 230 for receiving the convolution 24b as it enters between the plates 210 and 212. Plates 210 and 212 are also provided with arcuate notches 232 to accommodate the tube 22, as shown in Fig. 14.

Operation of prime movers

While the various prime movers hereinabove mentioned may take any form, it is contemplated that best results can be obtained through use of hydraulic and pneumatic systems as shown schematically in Figs. 1 and 2.

A control box readily accessible to the operator and broadly designated by the numeral 234, may be provided with valves 236 for controlling the supply of air to the prime movers 154, it being recalled that when two fins 24 are to be applied to the tube 22, a pair of rolls 134, both cooperable with the roll 106, will be utilized as illustrated in Fig. 1. The extent of pressure exerted by the roll 134 is determined by an air regulation valve having means 238 for actuating the same, and a dial 240 for indicating the extent of pressure. Air is supplied at 242 and a pipe 244 is shown in Fig. 1 leading to the control box 234. Air supply lines 246 and 247 lead from the box 234 to the prime movers 154.

The two prime movers 140 and the motor 120 are hydraulically operated and upon closing of a switch 248 on the control box 234, an electric motor (not shown) is energized to operate a pump (not shown) to direct hydraulic fluid to a supply line 250. The line 250 leads to the box 234 and is provided with a speed control valve 251 and a pressure indicating gage 252.

The flow of fluid is from valve 251 to one of the motors 140 through line 253, thence to the other motor 140 by way of line 254, then to motor 120 via line 255, and thereupon to a return line 256 by line 257. A by-pass line 258 connects valve 251 with line 256. A fluid drain line designated throughout by the numeral 260 is connected with motors 120 and 140.

Thus, rolls 106 and 134 are always driven at substantially the same surface speed by hydraulic synchronization. Valve 251 controls the speed of the entire machine by determining the flow of fluid to all of the motors 120 and 140 connected in series.

Operation

While the operation of the finning machine has been made clear as the description of the components thereof were described above, a short résumé of the operation is presented for clarification purposes.

Upon closing of the switch 248 (Fig. 2) a supply of hydraulic fluid will be furnished to the oil operated motors, whereupon the prime movers 120 and 140 will commence operating to continuously rotate the roll 106 through the belt 122, pulley 118 and shaft 116. Simultaneously, the tube 22, previously threaded in position between the rollers 52, will be advanced through the shaft 116 and the roll 106 in the direction of the arrow in Fig. 6.

Rollers 52 are also driven from the motor 120 through belt 122, pulley 118, belt 124 (Fig. 10), shaft 92 (Fig. 4), sprocket wheel 94, chain 100, sprocket wheels 96 (Fig. 3), and shafts 104 and 50, as shown in Figs. 4 and 6 respectively.

Tape 26 is threaded from the roller 184 (Figs. 13 and 14) through the opening 194 of the guide 28 shown in Fig. 17, and then downwardly along the surfaces 198 and 200 to a point where one edge of the tape 26 engages the tube 22 as tape 26 passes between rollers 106 and 134. If wrinkles are produced in the fin 24 formed by the rolls 106 and 134, they may be ironed out as desired through use of the plates 210 and 212 which receive one of the convolutions 24b. In any event, adjustment should be such as to cause the fin 24 to tightly engage the tube 22, but if desired, the fin 24 may be subsequently brazed to the tube 22.

In actual practice, the brazing operation is commenced by spraying and brushing a suitable flux composition on the tube 22 as it passes from the rollers 52 to the shaft 116. The spray box utilized for this purpose is shown in Fig. 4 of the drawing and designated by the numeral 234. The subsequent steps of brazing the fin 24 to the tube 22, forms no part of the present invention.

The provision of variable speed mechanism 128 permits the speed of rotation of roll 106 to be varied independently of rotation of rollers 52, while change of speed of prime mover 120 also effects a consequent change in the speed of rotation of rollers 52. The operator of the machine thus has very precise control over the finning operation and it is possible to change the r.p.m.'s of roll 106 without changing the rotation of rollers 52. It is further possible to retain the same speed of rotation of roll 106 while varying the speed of rollers 52 or, as another alternative, the speed of rotation of roll 106 and rollers 52 can be varied proportionally as necessary to produce the desired type of finned tube and with the fins thereon properly spaced.

It is seen that the machine is fully adjustable in all respects and, by virtue of such fact, it is possible to place the tape 26 upon the tube 22 and to form a proper spiral fin 24 from the tape 26 in any desired fashion. This is particularly important when it is considered that various results may be obtained depending upon the extent of stretching of the metal from which the tape 26 is formed. In some instances it may be desired to make adjustments such as to provide just the right amount of stretching of the tape 26 along the outermost edge of the fin 24 to eliminate all wrinkles. In other instances, it may be desired to form wrinkles either at the outermost or at the innermost edge of the fin 24 and to thereupon iron the wrinkles either inwardly or outwardly, or leave wrinkles, indentations or the like therein for such value as they may have in providing better heat exchange.

In this respect, therefore, particular note is made to the various adjustments which may be made in the roll 134 as shown in Fig. 9. Important also, is the interrelationship between the speed of rotation of the roll 106 and the speed of movement of the tube 22 through use of the fully adjustable rollers 52.

Having thus described the invention what is claimed as new and desired to be secured by Letters Patent is:

1. In a finning machine, a support; a pair of cooperable finning rolls rotatably carried by the support, one of the rolls having a central bore therethrough; apparatus on the support for advancing an elongated tube on its longitudinal axis through the bore of said one roll and including a number of frictional rollers rotatably disposed on the support in positions to engage and advance the tube through said one roll as the rollers are rotated; a rotatable element mounted on the support and connected to said one roll for rotation therewith; variable speed power means operably coupled with said element for rotating the element and thereby said one roll; and structure operably interconnecting the element and said rollers for rotating the latter as said element is rotated, said structure including variable speed mechanism permitting selective variation of the speed of rotation of the rollers relative to said one roll.

2. A finning machine as set forth in claim 1 wherein said apparatus for advancing and rotating the tube includes a spindle rotatably mounting each of the rollers on the support for rotation on axes radiating from the longitudinal axis of the tube, a follower attached to each of the spindles and extending laterally therefrom, and rotatable mechanism engaging said followers for rotating the rollers through equal arcs on the axes of respective spindles to adjust the angularity of the rollers relative to the tube and thereby varying the speed of advancement of the tube with respect to the speed of rotation of said one roll.

3. In a finning machine, a support; a first roll having an outer, frusto-conical, ribbon-engaging surface and a central bore therethrough coaxial with said surface; a tubular member joined to said first roll in axial alignment with the bore through the same and communicating with the latter, said member being rotatably mounted on said support in a position to receive a tube as the latter is advanced through the member and thereby said first roll while being continuously rotated; a variable speed power component operably coupled with said member for rotating the latter and thereby said first roll at a selectively variable speed; a second roll having an outer, substantially frusto-conical, ribbon-engaging face substantially complemental with said surface; a housing rotatably carrying the second roll; means shiftably mounting the housing on the support for movement in a plurality of directions in a common plane, said second roll being movable from an operable position with said face thereof disposed to cooperate with said surface in forming a spiral fin as a metal ribbon is passed between the rolls and winding the fin about said tube, to a location remote from said first roll and the housing being shiftable in a direction to change the relative angularity of the axes of the rolls regardless of the relative distance between said surface and the face of the first and second rolls respectively; and a variable speed prime mover operably coupled with said second roll for rotating the latter independently of rotation of the first roll.

4. A finning machine as set forth in claim 3 wherein said prime mover is rigidly mounted on said housing for movement therewith.

5. A finning machine as set forth in claim 4 wherein said means shiftably mounting the housing on the support includes a cam element carried by the housing and movably received within an elongated opening in the support disposed substantially perpendicularly to the axis of said first roll, and power operated means mounted on the support and operably coupled with said housing for shifting said second roll toward and away from the first roll as the power means is actuated, said opening limiting the reciprocation of the second roll toward and away from the first roll as said cam element moves in the same.

6. A finning machine as set forth in claim 5 wherein said means shiftably mounting the housing on the support includes structure for shifting the axis of rotation of the housing as the latter is moved by said power operated means to thereby vary the relative angularity of the axes of said first and second rolls.

7. A finning machine as set forth in claim 6 wherein said structure includes a crank rotatably carried by the support and provided with a laterally extending pin at one end thereof, a bracket secured to the housing and provided with an elongated slot normally disposed substantially perpendicularly to the axis of said first roll and slidably receiving said pin, and mechanism connected to the opposite end of the crank for rotating the latter a selected distance and for maintaining the same in predetermined positions relative to the support.

8. A finning machine as set forth in claim 3 wherein is provided means for guiding said ribbon to the rolls including a guide having a beveled portion engaging and disposed to hold the ribbon at the angularity of the pitch line between said surface and face of the first and second rolls respectively, said guide having means thereon for separating the ribbon as it passes to the rolls from the first convolution of the spiral thereof as the fin is formed on said tube.

References Cited in the file of this patent

UNITED STATES PATENTS

| | | |
|---|---|---|
| 711,852 | Hanson | Oct. 21, 1902 |
| 766,877 | Dews | Aug. 9, 1904 |
| 1,355,616 | Mohn | Oct. 12, 1920 |
| 1,472,719 | Horvath | Oct. 30, 1923 |
| 1,623,766 | Way | Apr. 5, 1927 |
| 1,713,678 | Seibert | May 21, 1929 |
| 1,850,936 | Lane et al. | Mar. 22, 1932 |
| 1,997,197 | Nigro | Apr. 9, 1935 |
| 2,190,429 | Kellog | Feb. 13, 1940 |
| 2,316,117 | Tilley | Apr. 6, 1943 |
| 2,374,144 | Strikeleather | Apr. 17, 1945 |
| 2,398,172 | Brugger | Apr. 9, 1946 |
| 2,426,522 | Porter | Aug. 26, 1947 |
| 2,532,239 | Newlin | Nov. 28, 1950 |
| 2,713,375 | Strikeleather | July 19, 1955 |

FOREIGN PATENTS

| | | |
|---|---|---|
| 423,356 | Germany | Jan. 31, 1925 |
| 451,529 | Germany | Oct. 6, 1927 |